United States Patent [19]

Paseri et al.

[11] Patent Number: 5,094,005
[45] Date of Patent: Mar. 10, 1992

[54] APPARATUS FOR INSPECTING CERTAIN OPTICAL PARAMETERS OF A MIRROR

[76] Inventors: Jacques Paseri, 10 rue du Bon Noyer, 91640 Briis Sur Forges; Benoît Torloting, 13 rue de la Cité Universitaire, 75014 Paris, both of France

[21] Appl. No.: 654,722
[22] Filed: Feb. 13, 1991

[30] Foreign Application Priority Data

Feb. 14, 1990 [FR] France .................................. 90 01747

[51] Int. Cl.$^5$ .............................................. G01B 5/22
[52] U.S. Cl. ........................................ 33/507; 33/533
[58] Field of Search ................... 33/533, 507, 501.1, 33/501.2, 501.09, 552, 553

[56] References Cited

U.S. PATENT DOCUMENTS

| | | | |
|---|---|---|---|
| 917,097 | 4/1909 | Michelsen | 33/507 |
| 4,693,012 | 9/1987 | Cesna | 33/533 |

FOREIGN PATENT DOCUMENTS 1516740 10/1989 U.S.S.R. .............................. 33/555.1

*Primary Examiner*—Harry N. Haroian
*Attorney, Agent, or Firm*—Blakely, Sokoloff, Taylor & Zafman

[57] ABSTRACT

The real surface of the mirror is represented by a set of values corresponding to radial or approximately radial distances between points distributed over the surface of the mirror and a spherical reference surface. The method is implemented by using apparatus comprising a support provided with at least three abutments suitable for supporting the support and distributed or suitable for being distributed as points on the surface of a sphere, the support also carrying at least one distance sensor. The invention is particularly suitable for inspecting the optical parameters of a plane, spherical, or aspherical mirror, and in particular mirrors for telescopes.

9 Claims, 3 Drawing Sheets

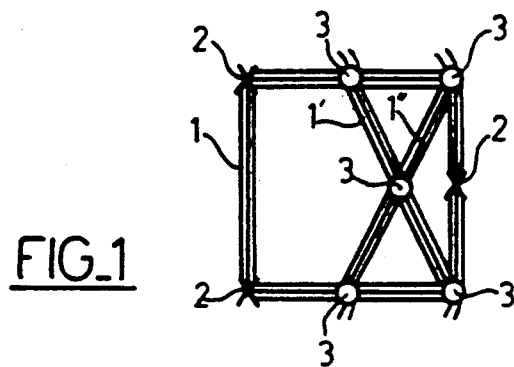
FIG_1
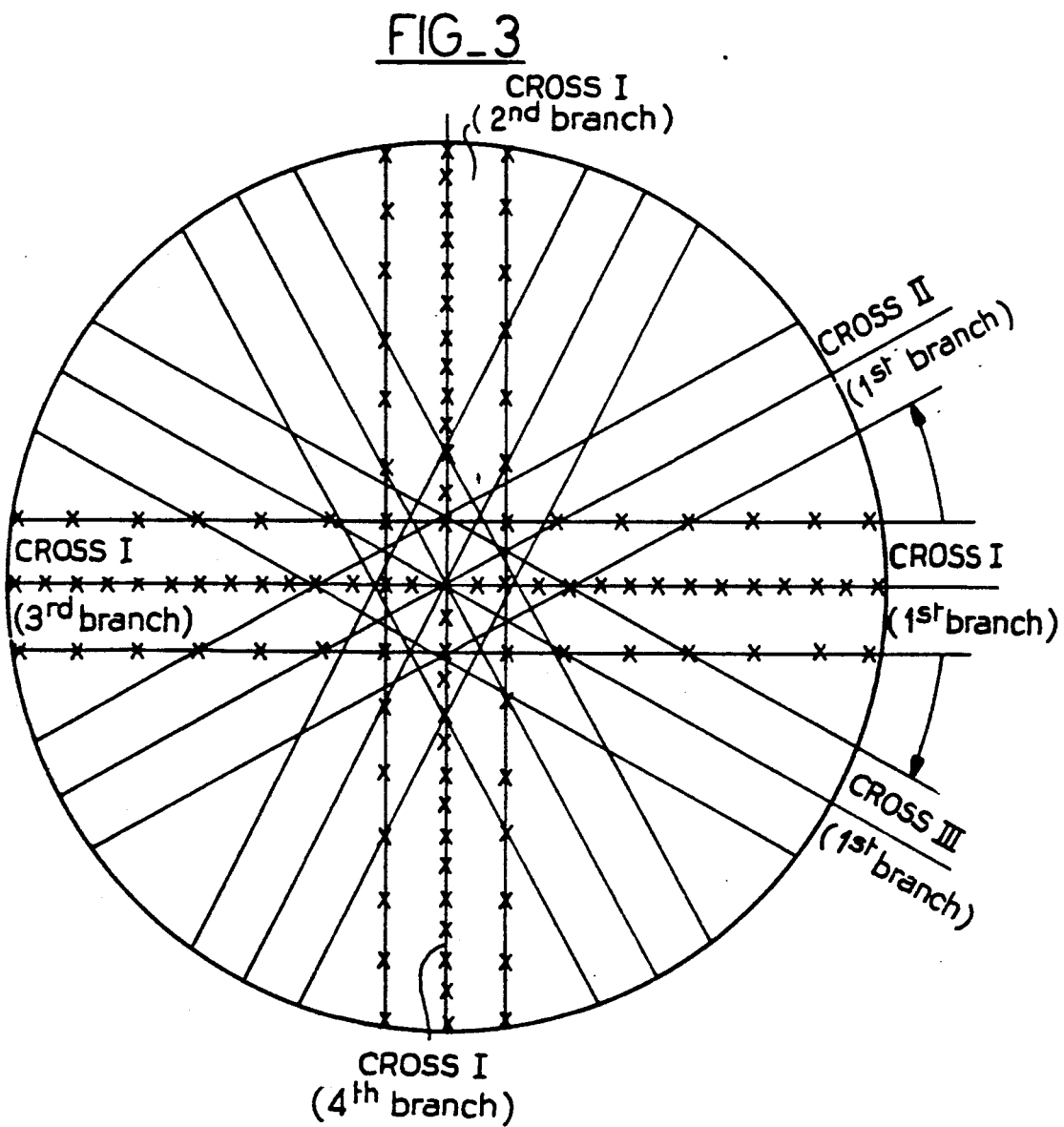
FIG_3

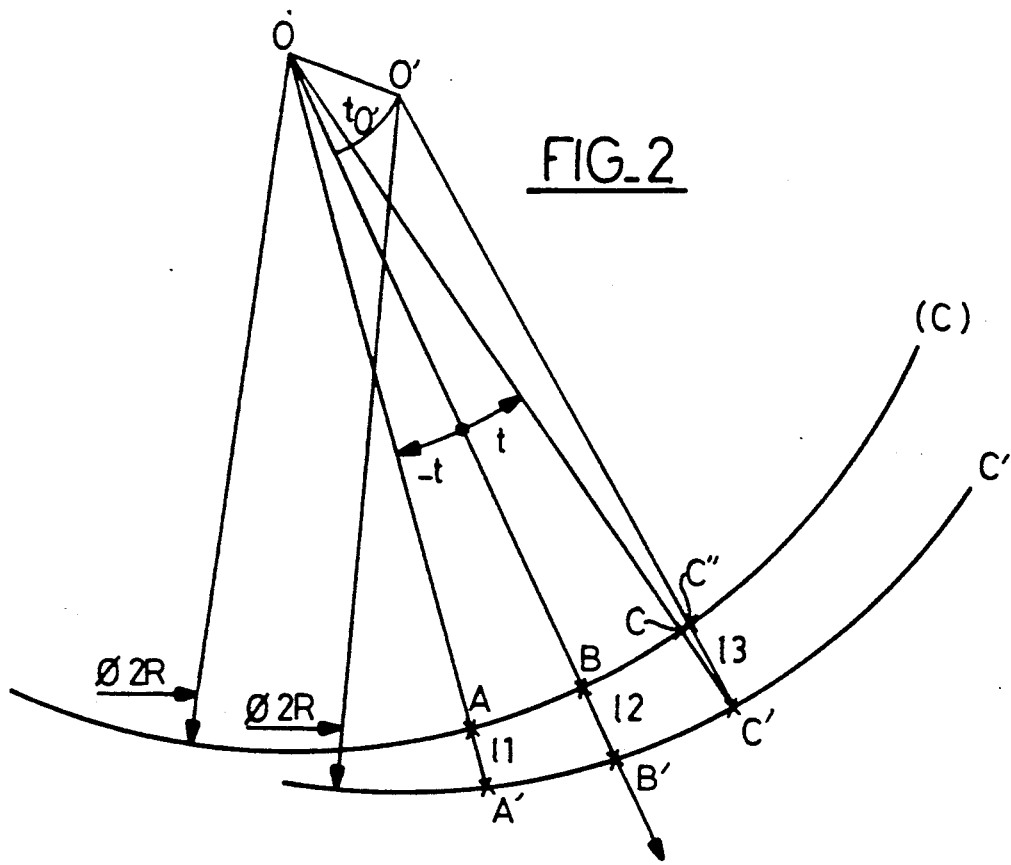
FIG_2
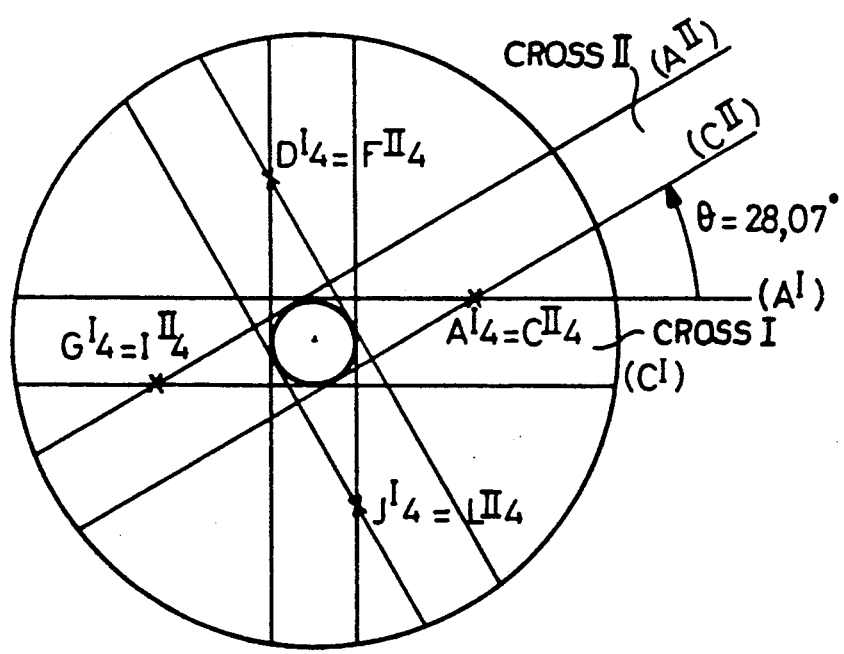
FIG_8

APPARATUS FOR INSPECTING CERTAIN OPTICAL PARAMETERS OF A MIRROR

The invention relates to a method and to apparatus for obtaining a representation of the real surface of a mirror, in particular for inspecting certain optical parameters of the mirror.

The invention is particularly applicable to an aspherical mirror and, where applicable, to a mirror that is spherical or plane.

It is particularly applicable to inspecting large mirrors for use in new telescopes.

On the basis of the values obtained, the method makes it possible, in particular, to calculate the eccentricity and the mean radius of curvature of the aspherical surface which is closest to the real surface of the mirror, and to determine the standard deviation of the variations of the real surface relative to the surface to be obtained and the difference between the greatest variation and the smallest variation.

As disclosed in U.S. Pat. No. 3,945,122, a representation of a surface can be obtained by measuring the distances from various points distributed over said surface to a reference surface having an extent comparable to that of the surface to be represented.

Such a technique cannot be used for a large telescope mirror, in particular because of the dimensions that would have to be given to the reference surface.

As disclosed in patent DD 243 096, the distances from various successive points along a line (meridian) on a mirror to a reference line can be measured by displacing an apparatus known as a linear spherometer along the line, which apparatus includes two abutments suitable for being calibrated and for resting on the mirror while defining the reference line and which includes a feeler in alignment with the abutments for measuring the distance from a point on the mirror line to a point on the reference line. Such a technique cannot be used to correlate measurements performed along successive lines and cannot be used to obtain a representation of the surface of the mirror.

The present invention seeks to adapt the spherometer technique to obtaining a representation of the surface of a mirror.

The present invention provides a method of obtaining a representation of the real surface of a mirror, in which the distances are measured from successive "measurement" points along a line on the surface of the mirror to a reference by displacing a support in a rectilinear direction, the support being provided with a main distance feeler suitable for feeling said line and being provided with calibrated abutments suitable for resting on "abutment" points on the surface of the mirror to define the reference, and repeating the operation as often as necessary, the method being characterized in that a support is used which is provided with at least three abutments suitable in conventional manner for defining a spherical reference surface, and with at least two auxiliary feelers disposed to right and to left of the main feeler to measure the distances to the spherical reference surface from successive points along two lines on the mirror and situated respectively to right and to left of the line followed by the main feeler, in that said support is displaced along said direction in such a manner that on each occasion two successive positions of the support have three points in common, which points in common are taken from the meaurement points and the abutment points, and in that said support is displaced along successive directions in such a manner that there exist measurement points in common between the displacements performed along two different directions, thereby making it possible on the basis of the measured distances to calculate distance values such that all of the values corresponds to a single position of the spherical surface.

The invention also relates to apparatus for obtaining a representation of the real surface of an aspherical mirror.

The apparatus is essentially constituted by an improved spherometer.

A conventional spherometer as described in U.S. Pat. No. 1,563,468, for example, is constituted by a support provided with three calibrated abutments suitable, after calibration, for defining a spherical reference surface and for holding the support on the surface to be measured, which support also carries a distance sensor suitable for feeling a point on the surface of the mirror and for measuring the distance from said point to the reference surface.

According to the invention, the spherometer is provided with at least two auxiliary distance sensors situated to right and to left of the main sensor in such a manner that by displacing the support along a direction, the main sensor feels points lying along a line on the surface of the mirror, while the auxiliary sensors feel points lying along two other lines on the surface of the mirror and situated respectively to right and to left of the line felt by the main feeler.

An implementation of the invention is described below with reference to the accompanying drawings, in which:

FIG. 1 is a diagram of one embodiment of apparatus of the invention;

FIG. 2 is a diagram relating to an extrapolation calculation between two successive positions of the apparatus;

FIG. 3 is a diagram showing various rectilinear paths of the apparatus over the surface of the mirror, said paths being in the form of the branches of three crosses;

FIG. 8 is a diagram showing two displacement crosses of the apparatus over the surface of the mirror.

FIG. 1 is a highly diagrammatic view of apparatus of the present invention for obtaining a representation of the real surface of an aspherical mirror.

Figure 4:
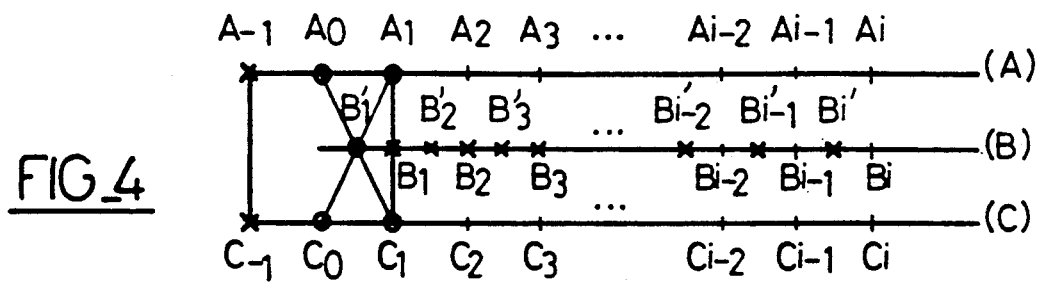
FIG. 4 is a detailed diagram of the successive positions of the apparatus along one of the branches of one of the crosses.

The apparatus comprises a support represented by a square frame 1 and 2 and by two crossed spacers 1' and 1". Two legs 2 and two distance sensors 3 are disposed at the four vertices of the frame. The frame also carries another leg 2 mounted in the middle of one of its sides and two other distance sensors 3 mounted in the middles of two other sides. Finally a fifth distance sensor is mounted in the middle of the cross formed by the spacers 1' and 1".

For example, for a mirror having a diameter of about 8 meters (m), it is advantageous to use a frame having a side of about 1 m.

The legs and the distance sensors are fixed or adjustable as may be necessary to enable the three legs to be pressed in abutment against the surface of a reference sphere and the five sensors also to be pressed against said surface or else to be adjusted at distances from said surface for calibration purposes so that the signals provided by the sensors in the presence of the mirror surface are representative of the distance from the sphere to the mirror.

In order to perform measurements, the support is placed on the mirror so that the legs of the support come in an abutment against the mirror, and then the signals provided by the sensors, which signals contain distance information, are used to calculate the distance from points on the mirror specified by the sensors to the surface of the reference sphere defined by the three abutments.

The support is then placed in another position and distances are again determined.

In order to combine measurements obtained in succession so that they can all be referred to a reference sphere occupying a singe position, steps are taken to ensure that there exist common locations between the legs and/or the sensors between two successive positions or two series of successive positions. Thereafter, it is easy to use linear extrapolation to determine the distances from the mirror to the sphere for the sphere occupying a fixed position.

FIG. 2 is a diagram showing two positions of the support, i.e. of the reference sphere. On a given meridian, the first position is the starting position defining the position of the sphere to which all other sphere positions are to be reduced, and the second position is an n-th position on the meridian.

In the first position, the center of the reference sphere is at O, and its surface is at (C).

At step (n−1) the distances are calculated from said sphere to the surface of the mirror along directions OA and OB.

In the n-th position, the current center of the sphere is O' and its current surface is (C'). The sensors measure the distances from the sphere in this position to the surface of the mirror along directions O'A', O'B', and O'C', and the distance from the mirror to the sphere (C) is calculated along the direction (OC) firstly by causing C'C and C'C" to coincide and secondly by calculating C'C by linear extrapolation from B'B and A'A calculated on the basis of the results of the preceding step (n−1).

If a system of polar coordinates is used centered on the point O and having the direction OB as its reference axis, then the polar coordinates of the point O' are the distance OO' and the angle (OB', OO').

Assuming that the distance OO' is very small compared with the radius R of the sphere which may be about 30 m, for example, while OO' is about 30 mm, then the distance L3 between the points C' and C is given by equation I:

$$L3 = OO'(\cos(t).\cos(t_0') + \sin(t).\sin(t_0')) \quad (I).$$

Now assuming that the value of the angle t is a few hundredths of a radian, then this reduces to equation II below:

$$L3 = 2L2 - L1 \quad (II)$$

This procedure can be performed step by step by moving the support over the surface of the mirror.

The invention is not limited to a particular displacement, but in order to facilitate calculation, it is convenient to displace the support along radial branches, and by way of example, FIG. 2 shows twelve displacement branches constituting three crosses referenced I, II, and III. In this figure, X is used to mark the measurement points on the four branches of the first cross.

In order to displace the support along a branch, the support is placed at the center and is displaced with a displacement step corresponding to one-half the side of the square constituted by its frame.

Thus, given the positions of the abutments and of the sensors on the frame, two sensors locations are obtained from one position to the next that become abutment locations, while two other sensor locations continue to be sensor locations.

FIG. 4 is a diagram showing successive locations of the abutments and of the sensors along the first branch of the first cross.

Figure 5:
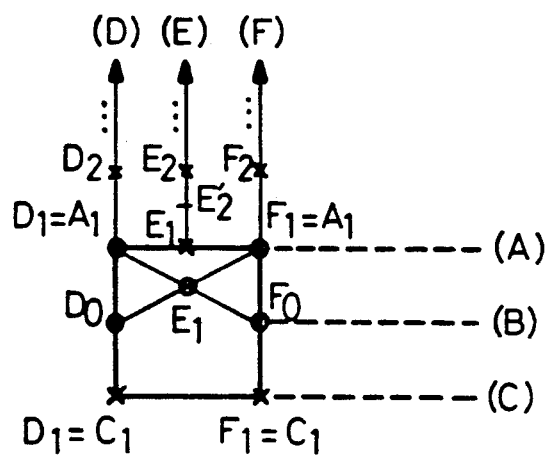
FIGS. 5 to 7 are diagrams relating to changes in the position of the device be rotating the device on itself in order to cause it to follow other branches of the cross.

FIG. 5 shows the starting position of the frame for the second branch of the first cross: it can be seen that this starting position is a central position that differs from the starting position for the first branch of the cross by rotation through 90°.

Figure 6:
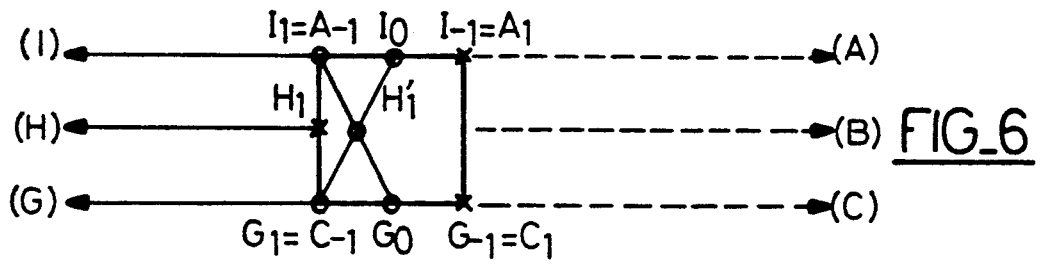
Figure 7:
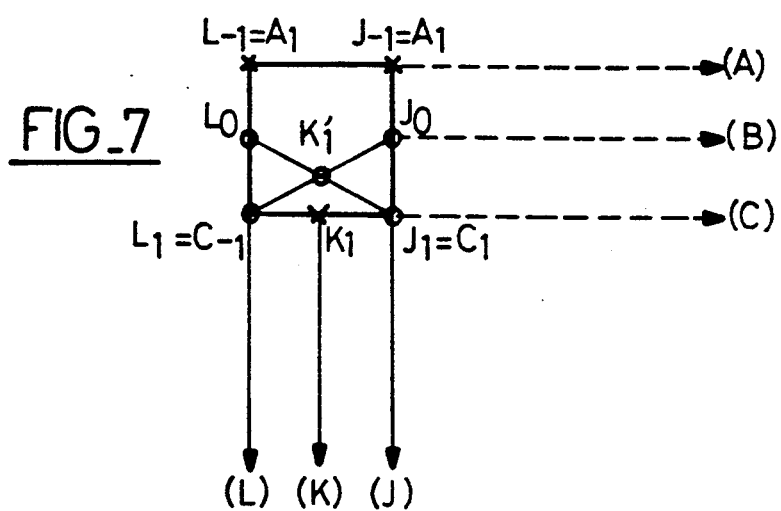

FIG. 6 shows the starting position for the third branch of the first cross in similar manner, which starting position corresponds to a further rotation through 90°, and finally FIG. 7 shows the starting position for the fourth branch of the first cross, after a further rotation through 90°.

The second cross is derived from the first cross by rotation through 28.7°, which angle is selected to ensure that the two crosses share four abutment and sensor locations in common, as can be seen in FIG. 3 and in simplified FIG. 8.

The third cross is derived from the first cross by rotation through −28.07° and likewise has points in common with the first cross, as can be seen in FIG. 3.

These common points enable the calculations performed on the various branches to be related to one another.

In one particular embodiment, the first cross provides 108 measurement points, with the first and second crosses together providing 212 measurement points, and with all three crosses providing a set of 316 measurement points.

Naturally, these dispositions are not limiting.

We claim:

1. Apparatus for obtaining a representation of the real surface of a mirror, the apparatus comprising a support provided with three abutments suitable, after calibration, for defining a spherical reference surface and for holding the support on the surface of the mirror, and with a main distance sensor suitable for feeling a point on the surface of the mirror and for measuring the distance from said point to said reference surface, the apparatus being characterized in that the support (1) is provided with at least two auxiliary distance sensors (3) situated to right and to left of the main sensor in such a manner that by displacing the support along a direction, the main sensor feels points lying along a line on the surface of the mirror, while the auxiliary sensors feel points lying along two other lines on the surface of the mirror, and situated respectively to right and to left of the line felt by the main feeler.

2. Apparatus according to claim 1, wherein the support (1) is provided with a plurality of sensors (3) oriented along straight lines passing through the center of said sphere.

3. Apparatus according to claim 1, wherein said support (1) is provided with a plurality of sensors (3) oriented in parallel.

4. Apparatus according to claim 1, 2 or 3, in which the abutments (2) and the sensors (3) are disposed at the vertices and at the centers of the sides of a polygon.

5. Apparatus according to claim 1, 2 or 3, comprising three abutments (2) disposed at two vertices of one side of a square or of a rectangle and in the middle of the opposite side.

6. Apparatus according to claim 1, 2 or 3, and including five sensors (3) distributed at the vertices and at the center of a rectangle.

7. The apparatus according to claim 1, 2 or 3, further comprising means for inspecting the optical properties of a plane, spherical, or aspherical mirror.

8. The apparatus according to claim 4 wherein said polygon is a square.

9. The apparatus according to claim 4 wherein said polygon is a rectangle.

* * * * *

UNITED STATES PATENT AND TRADEMARK OFFICE
CERTIFICATE OF CORRECTION

PATENT NO. : 5,094,005
DATED : March 10, 1992
INVENTOR(S) : Paseri et al.

It is certified that error appears in the above-identified patent and that said Letters Patent is hereby corrected as shown below:

On the title page, before "[21]   Appl. No. 654,722" insert:

--[73] Assignee:   R.E.O.S.C. (Recherches Et Etudes D'Optiques
                   Et De Sciences Connexes), Ballainvilliers
                   - 91160 Longjumeau/France--

Signed and Sealed this

Ninth Day of January, 1996

Attest:

BRUCE LEHMAN

Attesting Officer      Commissioner of Patents and Trademarks